(12) United States Patent
Dahn et al.

(10) Patent No.: US 8,574,762 B2
(45) Date of Patent: Nov. 5, 2013

(54) METAL OXIDE NEGATIVE ELECTRODES FOR LITHIUM-ION ELECTROCHEMICAL CELLS AND BATTERIES

(75) Inventors: Jeffrey R. Dahn, Halifax (CA); Jing Li, Halifax (CA); Mark N. Obrovac, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 273 days.

(21) Appl. No.: 13/224,925

(22) Filed: Sep. 2, 2011

(65) Prior Publication Data

US 2012/0003533 A1    Jan. 5, 2012

Related U.S. Application Data

(62) Division of application No. 12/129,141, filed on May 29, 2008, now Pat. No. 8,034,485.

(51) Int. Cl.
*H01M 4/62*    (2006.01)

(52) U.S. Cl.
USPC ............ 429/217; 429/231.1; 429/231.5; 429/218.1; 429/232; 252/500

(58) Field of Classification Search
USPC ............ 429/217, 231.1, 231.5, 218.1, 232; 252/500
See application file for complete search history.

(56) References Cited

U.S. PATENT DOCUMENTS

| | | |
|---|---|---|
| 5,296,318 A | 3/1994 | Gozdz et al. |
| 5,888,672 A | 3/1999 | Gustafson et al. |
| 6,287,722 B1 | 9/2001 | Barton et al. |
| 6,489,062 B1 | 12/2002 | Watanabe et al. |
| 6,558,846 B1 | 5/2003 | Tsushima et al. |
| 6,759,164 B2 | 7/2004 | Palazzo et al. |
| 6,790,555 B2 | 9/2004 | Kolb et al. |
| 6,790,561 B2 | 9/2004 | Gan et al. |
| 6,797,019 B2 | 9/2004 | Takeuchi et al. |
| 6,946,223 B2 | 9/2005 | Kusumoto et al. |
| 7,141,334 B2 | 11/2006 | Fukui et al. |
| 7,153,611 B2 | 12/2006 | Minami et al. |
| 7,341,804 B2 | 3/2008 | Christensen |
| 7,615,314 B2 | 11/2009 | Kawakami et al. |
| 7,655,356 B2 | 2/2010 | Takeuchi et al. |
| 8,034,485 B2 * | 10/2011 | Dahn et al. ............... 429/232 |
| 2002/0136952 A1 | 9/2002 | Travas-Sejdic et al. |
| 2004/0062991 A1 | 4/2004 | Fukui et al. |
| 2004/0191621 A1 | 9/2004 | Heller |
| 2005/0079417 A1 | 4/2005 | Kim et al. |
| 2005/0164090 A1 | 7/2005 | Kim et al. |
| 2006/0088766 A1 | 4/2006 | Kim et al. |
| 2006/0099506 A1 | 5/2006 | Krause et al. |
| 2006/0204850 A1 | 9/2006 | Ham et al. |
| 2006/0263688 A1 | 11/2006 | Guyomard et al. |
| 2007/0031660 A1 | 2/2007 | Kanamaru et al. |
| 2007/0092796 A1 | 4/2007 | Matsuda et al. |
| 2007/0166615 A1 | 7/2007 | Takamuku et al. |
| 2007/0298321 A1 | 12/2007 | Jouanneau-Si Larbi et al. |
| 2008/0213670 A1 | 9/2008 | Okada et al. |

FOREIGN PATENT DOCUMENTS

| | | |
|---|---|---|
| EP | 0 850 932 A1 | 7/1998 |
| EP | 1 361 194 A1 | 11/2003 |
| JP | 2003-282147 | 10/2003 |
| JP | 2006-294469 | 10/2006 |
| WO | 2008/097723 | 8/2008 |

OTHER PUBLICATIONS

Taberna, P.L. et al., "High Rate Capabilities $Fe_3O_4$-Based CU Nano-Architectured Electrodes for Lithium-Ion Battery Applications," Nature Materials, Jul. 2006, vol. 5, pp. 567-573.

Poizot, P. et al., "Nano-Sized Transition-Metal Oxides as Negative-Electrode Materials for Lithium-Ion Batteries," Letters to Nature, Sep. 28, 2000, vol. 407, pp. 496-499.

Larcher, D. et al., Combined XRD, EXAFS, and Mössbauer Studies of the Reduction by Lithium of $\alpha$-$Fe_2O_3$ With Various Particle Sizes, Journal of the Electrochemical Society, 150 (12), (2003), pp. A1643-A1650.

Larcher, D. et al., Effect of Particle Size on Lithium Intercalation Into $\alpha$-$Fe_2O_3$, Journal of the Electrochemical Society, 150 (1), (2003), pp. A133-A139.

Obrovac, M.N. et al., The Electrochemical Displacement Reaction of Lithium With Metal Oxides, Journal of the Electrochemical Society, 148 (6), (2001), pp. A576-A588.

\* cited by examiner

*Primary Examiner* — Laura Weiner

(74) *Attorney, Agent, or Firm* — Stephen F. Wolf; Adam Bramwell

(57) ABSTRACT

Provided are negative electrode compositions for lithium-ion electrochemical cells that include metal oxides and polymeric binders. Also provided are electrochemical cells and battery packs that include electrodes made with these compositions.

8 Claims, No Drawings

METAL OXIDE NEGATIVE ELECTRODES FOR LITHIUM-ION ELECTROCHEMICAL CELLS AND BATTERIES

RELATED APPLICATIONS

This is a divisional application which claims priority to application Ser. No. 12/129,141, filed May 29, 2008, which is now U.S. Pat. No. 8,034,485, the disclosure of which is herein incorporated by reference in its entirety.

FIELD

Provided are negative electrode compositions for lithium-ion electrochemical cells that include metal oxides and polymeric binders. Also provided are electrochemical cells and battery packs that include electrodes made with these compositions.

BACKGROUND

Powdered metal oxides of main group elements and conductive powders such as carbon black have been used to make negative electrodes for lithium-ion cells in a process that involves mixing the powdered active ingredients with a polymeric binder such as polyvinylidene fluoride. The mixed ingredients are prepared as a dispersion in a solvent for the polymeric binder, and coated onto a metal foil substrate, or current collector. The resulting composite electrode contains the powdered active ingredient in the binder adhered to the metal substrate.

Polymers, such as polyvinylidene fluoride, have been used as binders for metal, metal alloy, metal oxide and graphite-based lithium-ion cell electrodes. However, the first cycle irreversible capacity loss in the resulting cells can be unacceptably large, e.g., as large as 300 mAh/g or more for an electrode based on a powdered metal oxide material. In addition the capacity loss may be unacceptably large, e.g. as large as 70% capacity loss or more in 50 cycles for an electrode based on a powdered metal oxide material.

SUMMARY

In view of the foregoing, we recognize that there is a need for electrodes that undergo reduced first cycle capacity loss (irreversible capacity loss) and reduced capacity fade. In addition there is a need for electrodes that have high thermal stability and improved safety characteristics.

In one aspect, provided is an electrode composition for a negative electrode that includes a powdered material and a polymeric binder, wherein the powdered material includes a non-intercalating metal oxide, wherein the metal oxide is capable of undergoing lithiation and delithiation, and wherein the polymeric binder includes at least one of a polyacrylic acid, a lithium polyacrylate, or a polyimide.

In another aspect, provided is an electrode composition for a negative electrode that includes a powdered material and a polymeric binder wherein the powdered material includes an intercalating metal oxide, wherein the metal oxide is capable of undergoing lithiation and delithiation, and wherein the polymeric binder includes a lithium polyacrylate.

Other embodiments include electrochemical cells that incorporate one or more of the provided negative electrodes and battery packs that include at least one of the provided electrochemical cells. Additional embodiments include electronic devices that include the provided electrochemical cells or battery packs.

The use of the provided negative electrode materials and electrodes, electrochemical cells, and battery packs made therefrom can provide reduced irreversible capacity and fade. The irreversible first cycle capacity loss in these electrodes can be significantly decreased by forming the electrode using provided binders. The provided binders can be used to prepare electrodes and cells that exhibit decreased first cycle irreversible capacity loss compared to electrodes or cells made with conventional polymeric binders.

In this application:

"a", "an", and "the" are used interchangeably with "at least one" to mean one or more of the elements being described;

"active" refers to a material that can undergo lithiation and delithiation;

"charge" and "charging" refer to a process for providing electrochemical energy to a cell;

"delithiate" and "delithiation" refer to a process for removing lithium from an electrode material;

"discharge" and "discharging" refer to a process for removing electrochemical energy from a cell, e.g., when using the cell to perform desired work;

"intercalating metal oxide" refers to a metal oxide that acts as a host in which lithium can be electrochemically reversibly inserted and extracted at room temperature without significantly changing the crystal structure of the starting host material;

"lithiate" and "lithiation" refer to a process for adding lithium to an electrode material;

"metal oxide" refers to compounds that include at least one metal element, having the formula $MO_x$;

"negative electrode" refers to an electrode (often called an anode) where electrochemical oxidation and delithiation occurs during a discharging process;

"non-intercalating metal oxide" refers to a metal oxide that acts as a host in which lithium can be electrochemically reversibly inserted and extracted at room temperature and during this process the structure of the host material is substantially changed; and "positive electrode" refers to an electrode (often called a cathode) where electrochemical reduction and lithiation occurs during a discharging process;

The provided negative electrode compositions can provide compositions useful in the formation of negative electrodes for lithium-ion cells that, when combined with binders that include lithium polyacrylate, polyacrylic acid, or polyimide, can have one or more advantages such as, for example, higher capacities, decreased first cycle irreversible loss, and longer lifetime than those made using conventional processes. Of particular interest are negative electrode materials that include intercalating or non-intercalating metal oxide with appropriate binders as described herein.

The details of one or more embodiments are set forth in the accompanying description below. Other features, objects, and advantages will be apparent from the description and from the claims.

DETAILED DESCRIPTION

In the following description it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Provided is an electrode composition for a negative electrode that includes a powdered material and a polymeric binder, wherein the powdered material includes a non-intercalating metal oxide, wherein the metal oxide is capable of undergoing lithiation and delithiation, and wherein the polymeric binder includes at least one of a polyacrylic acid, a lithium polyacrylate, or a polyimide. The provided electrode compositions include a non-intercalating metal oxide. A non-intercalating metal oxide is a metal oxide into which lithium can be reversibly inserted and extracted electrochemically at room temperature and during this process the structure of the material is substantially changed. That is, the atomic structure of the metal oxide-containing material before lithium insertion and during lithium insertion is different. Crystalline, non-intercalating metal oxides can be transformed to a composite of nano-sized metal grains and nano-sized $Li_2O$ grains during lithium insertion. Examples of useful non-intercalating metal oxide materials include $Fe_2O_3$, CoO, $CO_3O_4$, NiO, CuO, MnO, and $LiFeO_2$. The provided electrode composition can also comprise at least one of an oxide of titanium, vanadium, chromium, manganese, iron, cobalt, nickel, copper, zinc, molybdenum, niobium, or tungsten.

For an intercalating metal oxide, the atomic structure of the material before lithium insertion and after a cycle of lithium insertion and full lithium removal are essentially the same. Furthermore during the lithium insertion/removal process the structure of the host material is unchanged, apart from lattice distortions. Examples of intercalating metal oxide negative electrode materials include $LiVO_2$, $Li_4Ti_5O_{12}$, $TiO_2$, $WO_2$, and $MoO_2$. Such materials can be improved in performance by doping with appropriate elements. For instance the capacity of $LiVO_2$ electrodes can be improved substantially by replacing some of the vanadium with other elements, as described in U.S. Pat. Publ. Nos. 2005/0079417, 2005/0164090, and 2006/0088766 (all Kim et al.). For the purposes of this In another aspect, provided is an electrode composition for a negative electrode that includes a powdered material and a polymeric binder wherein the powdered material includes an intercalating metal oxide, wherein the metal oxide is capable of undergoing lithiation and delithiation, and wherein the polymeric binder includes a lithium polyacrylate. An intercalating metal oxide is a metal oxide in which lithium can be reversibly inserted and extracted electrochemically at room temperature without significantly changing the atomic structure of the starting host material. In this disclosure, compositions written stoichiometrically such as $Li_4Ti_5O_{12}$, $TiO_2$, $WO_2$, and $MoO_2$ include doped varieties, such as $Li_{1.1}V_{0.85}Mo_{0.05}O_2$ (in which some of the vanadium has been replaced with molybdenum and lithium).

Exemplary powdered material can have a maximum length in one dimension that is no greater than 60 µm, no greater than 40 µm, no greater than 20 µm, or even smaller. The powders can, for example, have a maximum particle diameter that can be submicron (i.e., nanoparticulate), at least 1 µm, at least 2 µm, at least 5 µm, at least 10 µm or even larger. For example, suitable powders often have a maximum dimension of 1 µm to 60 µm, 10 µm to 60 µm, 20 µm to 60 µm, 40 µm to 60 µm, 1 µm to 40 µm, 2 µm to 40 µm, 10 µm to 40 µm, 5 µm to 20 µm, or 10 µm to 20 µm. The powdered materials can contain optional matrix formers within powder particles.

Exemplary powdered materials useful for making negative electrodes of this invention include metal oxide powders that include vanadium such as those described in U.S. Pat. Publ. Nos. 2005/0079417, 2005/0164090, and 2006/0088766 (all Kim et al.); and U.S. Pat. Publ. No. 2007/0166615 (Takamuku et al.); metal oxide powders that include titanium such as those described in 2007/0298321 (Larbi et al.) and U.S. Pat. No. 6,489,062 (Shunji et al.); metal oxide powders that include molybdenum as those described in U.S. Pat. No. 6,489,062 (Shunji et al.); metal oxide powders that include niobium as those described in U.S. Pat. No. 5,015,547 (Koshiba et al.); metal oxide powders that include molybdenum or tungsten such as those described in *J. Electrochem. Soc.*, 134(3), pg. 638-41 (1987) (Auborn et al.); metal oxide powders that include iron or cobalt such as those described in *J. Electrochem. Soc.* 148, pg. A576 (2001) (Obrovac et al.) combinations thereof and other powdered materials that will be familiar to those skilled in the art.

Powdered alloy particles can include a conductive coating. For example, a particle that contains a metal oxide can be coated with a layer of conductive material (e.g., with the metal oxide composition in the particle core and the conductive material in the particle shell). Suitable conductive materials include, for example, carbon, copper, silver, or nickel.

Exemplary powdered oxide anode materials can be prepared by any known means, for example, by heating precursor materials in a furnace, typically at temperatures above 300° C. The atmosphere during the heating process is not limited, typically the atmosphere during the heating process can be air, an inert atmosphere, a reducing atmosphere such as one containing hydrogen gas, or a mixture of gases. The precursor materials are also not limited. Suitable precursor materials can be one or more metal oxides, metal carbonates, metal nitrates, metal sulfates, metal chlorides or combinations thereof. Such precursor materials can be combined by grinding, mechanical milling, precipitation from solution, or by other methods known in the art. The precursor material can also be in the form of a sol-gel. After firing, the oxides can be treated with further processing, such as by mechanical milling to achieve an amorphous or nanocrystalline structure, grinding and particle sizing, surface coating, and by other methods known in the art. Exemplary powdered oxide anode materials can also be prepared by mechanical milling of precursor materials without firing. Powdered oxide materials prepared in this way often have a nanocrystalline or amorphous microstructure. Suitable milling can be done by using various techniques such as vertical ball milling, horizontal ball milling, or other milling techniques known to those skilled in the art.

The electrode composition can contain additives such as will be familiar to those skilled in the art. The electrode composition can include an electrically conductive diluent to facilitate electron transfer from the powdered material to a current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers, single-walled carbon nanotubes, multiple-walled carbon nanotubes, and combinations thereof.

The electrode composition can include an adhesion promoter that promotes adhesion of the powdered material or electrically conductive diluent to the binder. The combination of an adhesion promoter and binder can help the electrode composition better accommodate volume changes that can occur in the powdered material during repeated lithiation/delithiation cycles. The provided binders can offer sufficiently good adhesion to metals, alloys and metal oxides so that addition of an adhesion promoter may not be needed. If used, an adhesion promoter can be made a part of the binder (e.g., in the form of an added functional group), can be a coating on the powdered material, can be added to the electrically conductive diluent, or can be a combination of such measures. Examples of adhesion promoters include silanes, titanates, and phosphonates as described in U.S. Pat. No. 7,341,804 (Christensen).

Provided binders include lithium polysalts. Lithium polysalts include lithium polyacrylates (including polymethacrylates), lithium polystyrenesulfonates, and lithium polysulfonate fluoropolymers. The lithium polysalts are available from the corresponding acrylic or sulfonic acids by neutralization of the acidic groups with basic lithium. Commonly lithium hydroxide is used to neutralize acid groups. It is also within the scope of this application to replace other cations, such as sodium, with lithium by ion exchange. For example, an ion exchange resin such as SKT10L (available from Mitsubishi Chemical Industries under the trade name, DIANION), can be used to exchange sodium ion for lithium ion.

While not being bound by theory, it is believed that lithium polysalts can coat powdered active materials and form a layer which is ionically conductive. Since lithium-ion electrochemical cells depend upon lithium ion conductivity this enhances the ability of electrodes made with these binders to have extended life and reduced fade. Additionally, it is believed that the provided lithium polysalts coat the powdered active materials thinly enough that some electrical conductivity is maintained. Finally, it is believed that the lithium polysalts can suppress the formation of insulating SEI (solvent electrolyte interface) layers that are known by those skilled in the art to lead to premature lithium-ion electrode failure on repeated cycling.

The lithium polyacrylate binders include at least about 50 mole %, at least about 60 mole %, at least about 70 mole %, at least about 80 mole %, at least about 90 mole %, or even more, of lithium based upon the molar equivalents of acidic groups (on the ends or on pendant groups) of the acid from which the polysalt is derived. Acidic groups that can be neutralized include carboxylic acid, sulfonic acid, phosphonic acid, and any other acidic group that has one proton to exchange that are commonly found on polymers. Examples of commercial materials that are useful in this invention include perfluorosulfonic acid polymers such as NAPHION (available from DuPont, Wilmington, Del.), and thermoplastic ionomeric polymers such as SURLYN (also from Dupont). Other materials of interest include lithium polyimides such as those described in U.S. Pat. No. 6,287,722 (Barton et al.).

Lithium polyacrylate can be made from poly(acrylic acid) that is neutralized with lithium hydroxide. In this application, poly(acrylic acid) includes any polymer or copolymer of acrylic acid or methacrylic acid or their derivatives where at least about 50 mole %, at least about 60 mole %, at least about 70 mole %, at least about 80 mole %, or at least about 90 mole % of the copolymer is made using acrylic acid or methacrylic acid. Useful monomers that can be used to form these copolymers include, for example, alkyl esters of acrylic or methacrylic acid that have alkyl groups with 1-12 carbon atoms (branched or unbranched), acrylonitriles, acrylamides, N-alkyl acrylamides, N,N-dialkylacrylamides, hydroxyalkylacrylates, maleic acid, propanesulfonates, and the like. Of particular interest are polymers or copolymers of acrylic acid or methacrylic acid that are water soluble—especially after neutralization or partial neutralization. Water solubility is typically a function of the molecular weight of the polymer or copolymer and/or the composition. Poly(acrylic acid) is very water soluble and is preferred along with copolymers that contain significant mole fractions of acrylic acid. Poly(methacrylic) acid is less water soluble—particularly at larger molecular weights.

Homopolymers and copolymers of acrylic and methacrylic acid that are useful as binders can have a molecular weight ($M_w$) of greater than about 10,000 g/mole, greater than about 75,000 g/mole, or even greater than about 450,000 g/mole, or even higher. The homopolymers and copolymer that are useful in this invention have a molecular weight ($M_w$) of less than about 3,000,000 g/mole, less than about 500,000 g/mole, less than about 450,000 g/mole, or even lower. Carboxylic acidic groups on the polymers or copolymers can be neutralized by dissolving the polymers or copolymers in water or another suitable solvent such as tetrahydrofuran, dimethylsulfoxide, N,N-dimethylformamide, or one or more other dipolar aprotic solvents that are miscible with water. The carboxylic acid groups (acrylic acid or methacrylic acid) on the polymers or copolymers can be titrated with an aqueous solution of lithium hydroxide. For example, a solution of 34 wt % poly(acrylic acid) in water can be neutralized by titration with a 20 wt % solution of aqueous lithium hydroxide. Typically, 50% or more, 60% or more, 70% or more, 80% or more, 90% or more, 100% or more, 107% or more of the carboxylic acid groups are lithiated (neutralized with lithium hydroxide) on a molar basis. When more than 100% of the carboxylic acid groups have been neutralized this means that enough lithium hydroxide has been added to the polymer or copolymer to neutralize all of the groups with an excess of lithium hydroxide present.

Polymeric binders that can also be included in embodiments of the provided electrode compositions include polyimide binders. Useful polyimide binders include aromatic, aliphatic or cycloaliphatic polyimide binders. Conventional polyimide binders can be prepared by reacting an aromatic dianhydride and a diamine This reaction leads to the formation of an aromatic polyamic acid, and subsequent chemical or thermal cyclization leads to the polyimide. Aliphatic or cycloaliphatic polyimide binders can also be used in some embodiments of the provided electrode compositions comprises repeating units having the formula:

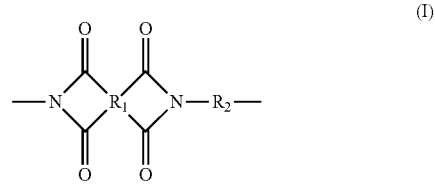

(I)

where $R_1$ is aliphatic or cycloaliphatic and $R_2$ is aromatic, aliphatic, cycloaliphatic or a combination thereof. The polyimide binders are disclosed, for example, in U.S. Pat. Publ. No. 2006/099506 (Krause et al.).

The provided binders can be mixed with other polymeric materials to make a blend of materials. This may be done, for example, to increase the adhesion, to provide enhanced conductivity, to change the thermal properties, or to affect other physical properties of the binder. The binders of this invention, however, can be non-elastomeric. By non-elastomeric it is meant that the binders do not contain substantial amounts of natural or synthetic rubber. Synthetic rubbers include styrene-butadiene rubbers and latexes of styrene-butadiene rubbers. For example, the binders of this invention contain less than 20 weight percent (wt %), less than 10 wt %, less than 5 wt %, less than 2 wt %, or even less of natural or synthetic rubber.

A variety of electrolytes can be employed in the disclosed lithium-ion cells. Representative electrolytes contain one or more lithium salts and a charge-carrying medium in the form of a solid, liquid, or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary charge-carrying media are stable without freezing or boiling in the electrochemical window and temperature range within which the cell electrodes can operate, are capable of solubilizing sufficient quantities of the lithium salt so that a suitable quantity of charge can be transported from the positive electrode to the negative electrode, and perform well in the chosen lithium-ion cell. Exemplary solid charge carrying media include polymeric media such as polyethylene oxide, polytetrafluoroethylene, polyvinylidene fluoride, fluorine-containing copolymers, polyacrylonitrile, combinations thereof, and other solid media that will be familiar to those skilled in the art. Exemplary liquid charge carrying media include ethylene carbonate, propylene carbonate, dimethyl carbonate, diethyl carbonate, ethyl methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl)ether), tetrahydrofuran, dioxolane, combinations thereof and other media that will be familiar to those skilled in the art. Exemplary charge carrying media gels include those described in U.S. Pat. Nos. 6,387,570 (Nakamura et al.) and 6,780,544 (Noh). The charge carrying media solubilizing power can be improved through addition of a suitable cosolvent. Exemplary cosolvents include aromatic materials compatible with lithium-ion cells containing the chosen electrolyte. Representative cosolvents include toluene, sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. Nos. 5,709,968 (Shimizu), 5,763,119 (Adachi), 5,536,599 (Alamgir et al.), 5,858,573 (Abraham et al.), 5,882,812 (Visco et al.), 6,004,698 (Richardson et al.), 6,045,952 (Kerr et al.), and 6,387,571 (Lain et al.); and in U.S. Pat. Publ. Nos. 2005/0221168, 2005/0221196, 2006/0263696, and 2006/0263697 (all to Dahn et al.).

The provided electrochemical cells can be made by taking at least one each of a positive electrode and a negative electrode as described above and placing them in an electrolyte. Typically, a microporous separator, such as CELGARD 2400 microporous material, available from Celgard LLC, Charlotte, N.C., can be used to prevent the contact of the negative electrode directly with the positive electrode. Electrochemical cells made with the provided negative electrodes and binders showed reduced irreversible capacity loss and less fade than similar cells containing negative electrodes with conventional binders.

Positive electrodes useful in the provided electrochemical cells can include, for example, $LiCO_{0.2}Ni_{0.8}O_2$, $LiNiO_2$, $LiFePO_4$, $LiMnPO_4$, $LiCoPO_4$, $LiMn_2O_4$, and $LiCoO_2$; the cathode compositions that include mixed metal oxides of cobalt, manganese, and nickel such as those described in U.S. Pat. Nos. 6,964,828 and 7,078,128 (Lu et al.); and nanocomposite cathode compositions such as those described in U.S. Pat. No. 6,680,145 (Obrovac et al.). Other exemplary positive electrodes can include $LiNi_{0.5}Mn_{1.5}O_4$ and $LiVPO_4F$.

The provided cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the provided electrochemical cells can be combined to provide battery pack. Further details regarding the construction and use of rechargeable lithium-ion cells and battery packs will be familiar to those skilled in the art.

Objects and advantages of this invention are further illustrated by the following examples, but the particular materials and amounts thereof recited in these examples, as well as other conditions and details, should not be construed to unduly limit this invention.

EXAMPLES

Preparation of Poly(Acrylic Acid) (PAA, Neutralized with LiOH) Solution

Starting material A: 15.258 g $LiOH.H_2O$ (Sigma-Aldrich) was mixed with 137.610 g distilled water using a magnetic stirrer. The formed $LiOH.H_2O$ solution was 9.98 wt % LiOH.

Starting material B: 25 wt % PAA solution (Alfa Aesar, $M_n$ 240,000).

128.457 g of material A was added into 88.045 g material B. The mixture was stirred overnight. The formed solution was 11 wt % PAA (100% Li salt-all acid neutralized without excess) binder solution.

Electrode Fabrication

Examples 1-7 and Comparative Examples 1-5

A coating composition of 80 wt % active material (AM), 12 wt % carbon black and 8 wt % binder were used to fabricate negative electrodes. Active materials (AM) were tested include $Fe_2O_3$, FeO, $CO_3O_4$, and CoO. Ball-milled materials were processed as follows: 4 g of active material powder (either $Fe_2O_3$ powder or $CO_3O_4$ powder) was milled for 2 hrs under argon protection using a Spex 8000 high energy ball milling machine with 12 mm diameter hardened stainless steel balls as the mixing media. The carbon black used was super S carbon black (SS) (MMM Carbon, Belgium). Binders used included poly(vinylidene fluoride) (PVDF), poly (acrylic acid) Li salt (PAA-100% neutralized), polyimide (PI), and sodium carboxymethyl cellulose (CMC). The compositions of the tested electrodes are shown in Table 1.

TABLE 1

Compositions of Electrodes of Examples 1-7 and Comparative Examples 1-5

| Example | Active material (AM) | Carbon black | Binder |
|---|---|---|---|
| 1 | $Fe_2O_3$ | SS | PAA(-100% Li salt) |
| 2 | $Fe_2O_3$ ball-milled | SS | PAA(-100% Li salt) |
| 3 | $Fe_2O_3$ | SS | PI |
| 4 | $Fe_2O_3$ ball-milled | SS | PI |
| 5 | FeO | SS | PI |
| 6 | $Co_3O_4$ ball-milled | SS | PI |
| 7 | CoO | SS | PI |
| Comparative 1 | $Fe_2O_3$ | SS | PVDF |
| Comparative 2 | $Fe_2O_3$ | SS | CMC |
| Comparative 3 | $Fe_2O_3$ ball-milled | SS | PVDF |
| Comparative 4 | $Fe_2O_3$ ball-milled | SS | CMC |
| Comparative 5 | $Co_3O_4$ ball-milled | SS | PVDF |

Electrode Preparation

Examples 1-7 and Comparative Examples 1-5

Example 1

0.592 g AM, 0.089 g SS, 0.538 g PAA (−100% Li salt) solution (11 wt % solution in water, made by the method mentioned above) and 1.389 g water were added into an egg-shaped hardened steel vial. The mixture was shaken for one half hr at 500 shakes per minute using a low energy ball mill (modified Spex 8000 mill). The formed slurry was then cast on a copper foil with a 75 μm high notch bar and dried at 90° C. in air overnight. Typical active material loading was 1.58 mg/cm².

Example 2

0.503 g AM, 0.075 g SS, 0.457 g PAA (100% Li salt) solution (11 wt % solution in water, made by the method mentioned above) and 1.313 g water were added into an egg-shaped hardened steel vial. The mixture was shaken to form a slurry and then coated and dried as described in Example 1. Typical active material loading was 1.32 mg/cm².

Example 3

0.518 g AM, 0.077 g SS, 0.263 g PI solution (HD Micro PI2525, 19.6 solid wt % solution in NMP) and 1.400 g NMP were added into an egg-shaped hardened steel vial. The mixture was shaken to form a slurry and then coated and dried as described in Example 1. Typical active material loading was 1.38 mg/cm².

Example 4

0.608 g AM, 0.091 g SS, 0.310 g PI solution (HD micro PI2525, 19.6 solid wt % solution in NMP) and 1.545 g NMP were added into an egg-shaped hardened steel vial. The mixture was shaken to form a slurry and then coated and dried as described in Example 1. Typical active material loading was 1.45 mg/cm².

Examples 5-7

0.484 g AM, 0.073 g SS, 0.247 g PI solution (HD micro PI2525, 19.6 solid wt % solution in NMP) and 1.242 g NMP were added into an egg-shaped hardened steel vial. The mixture was shaken to form a slurry and then coated and dried as described in Example 1. Typical active material loading was 1.65 mg/cm².

Comparative Example 1

0.590 g AM, 0.088 g SS, 0.655 g PVDF solution (9 wt % solution of KYNAR 461 in N-methylpyrrolidinone (NMP)) and 1.545 g NMP were added into an egg-shaped hardened steel vial. The mixture was shaken to form a slurry and then coated and dried as described in Example 1. Typical active material loading was 1.19 mg/cm².

Comparative Example 2

0.500 g AM, 0.075 g SS, 0.050 g CMC powder (Daicel CMC2200) and 2.485 g water were added into an egg-shaped hardened steel vial. The mixture was shaken to form a slurry and then coated and dried as described in Example 1. Typical active material loading was 1.00 mg/cm².

Comparative Example 3

0.515 g AM, 0.077 g SS, 0.572 g PVDF solution (9 wt % solution in N-methyl pyrrolidinone (NMP), NRC Canada) and 1.562 g NMP were added into an egg-shaped hardened steel vial. The mixture was shaken to form a slurry and then coated and dried as described in Example 1. Typical active material loading was 1.07 mg/cm².

Comparative Example 4

0.500 g AM, 0.075 g SS, 0.050 g CMC powder (Daicel CMC2200) and 2.565 g water were added into an egg-shaped hardened steel vial. The mixture was shaken to form a slurry and then coated and dried as described in Example 1. Typical active material loading was 0.94 mg/cm².

Comparative Example 5

0.484 g AM, 0.073 g SS, 0.247 g PI solution (HD micro PI2525, 19.6 solid wt % solution in NMP) and 1.242 g NMP were added into an egg-shaped hardened steel vial. The mixture was shaken to form a slurry and then coated and dried as described in Example 1. Typical active material loading was 1.65 mg/cm².

Test Cell Preparation for Examples 1-7 and Comparative Examples 1-5

The electrodes described above served as a working electrode in a 2325-type coin cell using a lithium foil (FMC) disk as a counter and reference electrode. Two layers of microporous polypropylene (PP) separator (CELGARD 2500) were used for each coin cell. The electrolyte used was 1 M $LiPF_6$ (Stella, Japan) in a mixed solution of 90 wt % ethylene carbonate (EC):diethyl carbonate (DEC) (volume ratio 1:2, Grant Chemical Ferro Division) and 10 wt % fluoroethylene carbonate (FEC, Fujian Chuangxin, China). The coin cells were assembled and crimped closed in an argon-filled glove box. The cells were cycled at C/20 for the first two cycles, followed by cycling at C/5 for the rest of the cycles. C-rate was calculated based on a specific capacity of 1007 mAh/g. Cycling results (mAh/g vs. cycle number) are listed in Table 2:

TABLE 2

Cycling Results of Electrodes of Examples 1-7 and Comparative Examples 1-5

| Example | First Cycle Delithiation Capacity (mAh/g) | 50th Cycle Delithiation Capacity (mAh/g) |
|---|---|---|
| 1 | Cell #1(#2) | Cell #1(#2) |
|   | 877(960) | 727(848) |
| 2 | 948(892) | 732(717) |
| 3 | 994(1007) | 813(844) |
| 4 | 1052(1056) | 852(866) |
| 5 | 771(748) | 478(452) |
| 6 | 741 | 726 |
| 7 | 782(773) | 588(581) |
| Comparative 1 | 786(699) | 422(422) |
| Comparative 2 | 864(864) | 654(649) |
| Comparative 3 | 822(840) | 513(516) |
| Comparative 4 | 961(975) | 738(322) |
| Comparative 5 | 777(713) | 638(587) |

Synthesis of $Li_{1.1}V_{0.85}Mo_{0.05}O_2$

Examples 8 and Comparative Example 6

$Li_{1.1}V_{0.85}Mo_{0.05}O_2$ was prepared by first grinding together by hand 4.500 g of $V_2O_3$ (Aldrich 98%), 2.871 g of $Li_2CO_3$ (Alfa Aesar 99.0%) and 0.507 g of $MoO_3$ (BDH Chemicals Ltd. 99.5%). The ground mixture was then placed in a graphite crucible and heated in a tube furnace under flowing argon gas for 12 hours at 1000° C.

Example 8

2.4 g $Li_{1.1}V_{0.85}Mo_{0.50}O_2$ prepared as described above, 0.36 g SS, 2.18 g PAA (100% Li salt) solution (11 wt % solution in water, made by the method mentioned above) and 2.86 g water were added into an egg-shaped hardened steel vial. The mixture was shaken to form a slurry and then coated and dried as described in Example 1.

Comparative Example 6

2.58 g $Li_{1.1}V_{0.85}Mo_{0.05}O_2$ prepared as described above, 0.21 g SS, 2.33 g PVDF solution (9 wt % solution in N-methylpyrrolidinone (NMP), NRC Canada) and 0.5 g NMP were added into an egg-shaped hardened steel vial. The mixture was shaken to form a slurry and then coated and dried as described in Example 1.
Test Cell Preparation for Example 8 and Comparative Examples 6

The electrodes described above served as a working electrode in a 2325-type coin cell using a lithium foil (FMC) disk as a counter and reference electrode. Two layers of microporous polypropylene (PP) separator (CELGARD 2500) were used for each coin cell. The electrolyte used was 1 M $LiPF_6$ (Stella, Japan) in a mixed solution of 90 wt % ethylene carbonate (EC):diethyl carbonate (DEC) (volume ratio 1:2, Grant Chemical Ferro Division) and 10 wt % fluoroethylene carbonate (FEC, Fujian Chuangxin, China). The coin cells were assembled and crimped closed in an argon-filled glove box. The cells were cycled at C/20 rate between 2 V and 0.025 V. C-rate was calculated based on a specific capacity of 300 mAh/g. Cycling results (mAh/g vs. cycle number) are listed in Table 3:

TABLE 3

Cycling Results of Electrodes of Example 8 and Comparative Example 6

| Example | First Cycle Delithiation Capacity (mAh/g) | 50th Cycle Delithiation Capacity (mAh/g) |
|---|---|---|
| 8 | 300.7 | 218.5 |
| Comparative 6 | 125.9 | 9.1 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An electrode composition for a negative electrode comprising:
a powdered material; and
a polymeric binder,
wherein the powdered material includes an intercalating metal oxide, wherein the metal oxide is capable of undergoing lithiation and delithiation, and wherein the polymeric binder includes a lithium polyacrylate, and
wherein the powdered material comprises $LiVO_2$ in which up to 15 mole percent of the V is replaced by a combination of lithium and molybdenum.

2. A lithium-ion electrochemical cell comprising:
a positive electrode,
an electrolyte; and
a negative electrode that comprises an electrode composition according to claim 1.

3. A battery pack comprising at least one lithium-ion electrochemical cell according to claim 2.

4. An electronic device comprising a battery pack according to claim 3.

5. An electrode composition for a negative electrode comprising:
a powdered material; and
a polymeric binder,
wherein the powdered material includes an intercalating metal oxide, wherein the metal oxide is capable of undergoing lithiation and delithiation, and wherein the polymeric binder includes a lithium polyacrylate, and
wherein the powdered material comprises at least one of $LiVO_2$, $Li_{1.1}V_{0.85}Mo_{0.05}O_2$, $Li_4Ti_5O_{12}$, $TiO_2$, $WO_2$, or $MoO_2$.

6. A lithium-ion electrochemical cell comprising:
a positive electrode,
an electrolyte; and
a negative electrode that comprises an electrode composition according to claim 5.

7. A battery pack comprising at least one lithium-ion electrochemical cell according to claim 6.

8. An electronic device comprising a battery pack according to claim 7.

* * * * *